US009641670B2

(12) United States Patent
Yoo

(10) Patent No.: US 9,641,670 B2
(45) Date of Patent: May 2, 2017

(54) METHOD AND SYSTEM FOR CONTROLLING CALL ANSWER

(71) Applicant: COUCHGRAM CO., LTD., Seongnam-si, Gyeonggi-do (KR)

(72) Inventor: Soo Geun Yoo, Yongin-si (KR)

(73) Assignee: COUCHGRAM CO., LTD., Seongnam-si, Gyeonggi-do ( * ) Notice: Subject to any disclaimer, the term of this patent is extended or adjusted under 35 U.S.C. 154(b) by 0 days.

(21) Appl. No.: 14/842,320

(22) Filed: Sep. 1, 2015

(65) Prior Publication Data
US 2016/0142533 A1 May 19, 2016

(30) Foreign Application Priority Data
Nov. 13, 2014 (KR) .......................... 10-2014-0158108

(51) Int. Cl.
*H04M 1/725* (2006.01)
*H04M 1/57* (2006.01)

(52) U.S. Cl.
CPC ... *H04M 1/72583* (2013.01); *H04M 1/72597* (2013.01); *H04M 1/57* (2013.01); *H04M 1/72536* (2013.01); *H04M 2250/22* (2013.01)

(58) Field of Classification Search
CPC H04M 1/26; H04M 1/57; H04M 1/66–1/677; H04M 1/72583; H04M 1/72597; H04M 1/72536; H04M 2250/22
USPC .................................. 455/410, 411, 415, 567
See application file for complete search history.

(56) References Cited

U.S. PATENT DOCUMENTS

| | | | | |
|---|---|---|---|---|
| 6,662,023 | B1* | 12/2003 | Helle | H04M 1/67 455/411 |
| 2007/0293211 | A1* | 12/2007 | Yang | H04M 1/72555 455/420 |
| 2007/0293274 | A1* | 12/2007 | Gieseke | H04M 1/72522 455/566 |
| 2010/0262928 | A1 | 10/2010 | Abbott | |
| 2012/0317250 | A1* | 12/2012 | Fine | H04L 29/12754 709/220 |
| 2013/0033436 | A1 | 2/2013 | Brinda et al. | |
| 2013/0106742 | A1 | 5/2013 | Lee et al. | |
| 2013/0331073 | A1* | 12/2013 | Balan | H04W 4/16 455/415 |

(Continued)

FOREIGN PATENT DOCUMENTS

| | | | |
|---|---|---|---|
| JP | 2005117170 A | 4/2005 | |
| JP | 2007299233 A | 11/2007 | |
| JP | 2012095070 A | 5/2012 | |

(Continued)

*Primary Examiner* — Raymond Dean
(74) *Attorney, Agent, or Firm* — Hauptman Ham, LLP

(57) ABSTRACT

A method of controlling answering a call in a system including a service server, a plurality of mobile terminals including a sender terminal and a receiver terminal, and a network configured to allow a communication between the service server and the mobile terminals includes displaying, when receiving a call, an incoming call icon and an incoming call screen, which are set in advance at the sender terminal, on the receiver terminal, receiving, upon the incoming call icon being displayed, an input of a predetermined operation on the incoming call screen at the receiver terminal, and permitting answering the call based on the predetermined operation at the receiver terminal.

24 Claims, 19 Drawing Sheets

(56) References Cited

U.S. PATENT DOCUMENTS

2014/0045470 A1\* 2/2014 Bridge ................... H04W 4/16
                                                                                    455/415

FOREIGN PATENT DOCUMENTS

| | | |
|---|---|---|
| JP | 2012103951 A | 5/2012 |
| JP | 2013524694 A | 6/2013 |
| JP | 2014150375 A | 8/2014 |
| JP | 2014175677 A | 9/2014 |
| KR | 1020080066406 A | 7/2008 |
| KR | 1020090000278 A | 1/2009 |
| KR | 1020140062795 A | 5/2014 |

\* cited by examiner

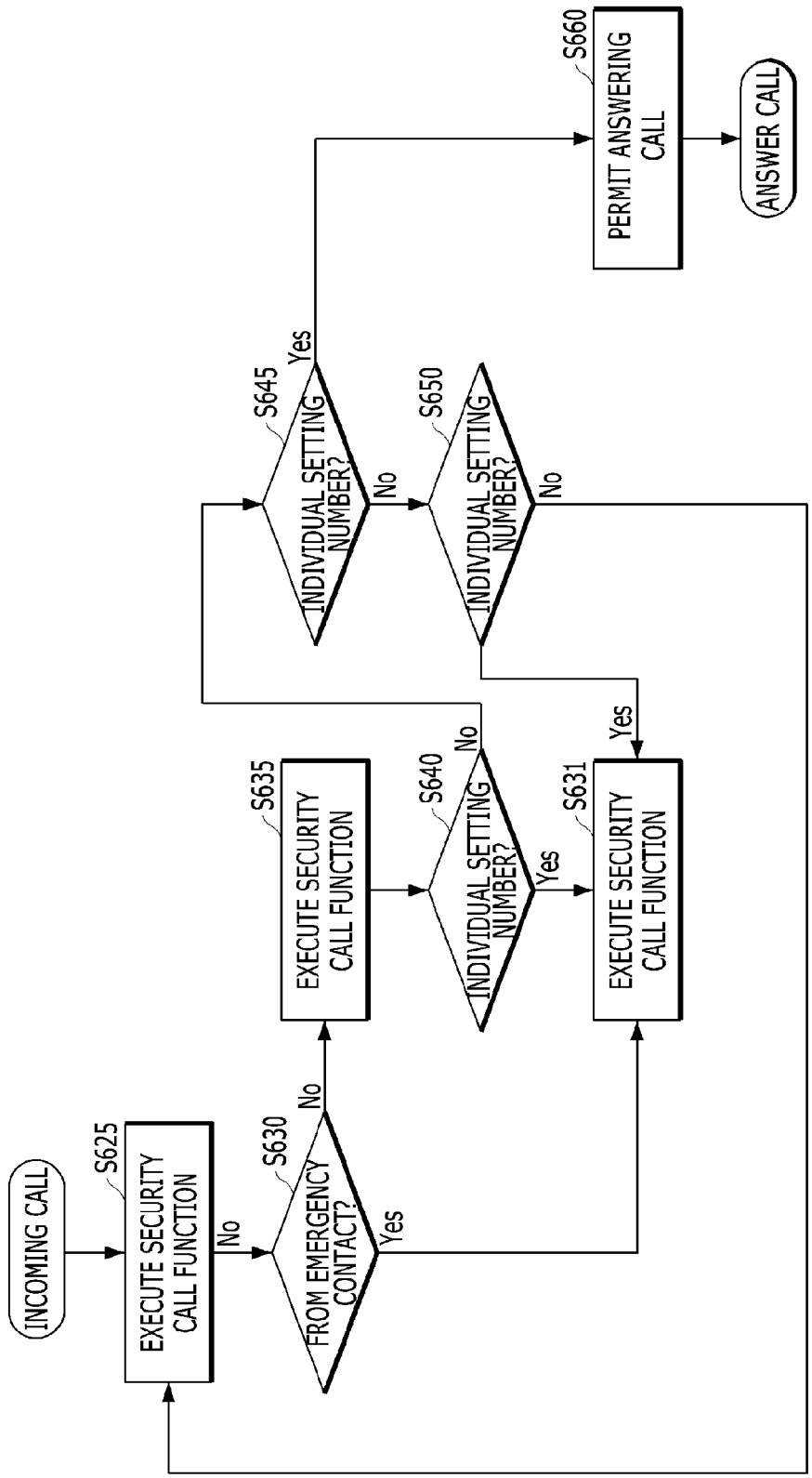

EI

IM

EI+TX_2

TI+IM+TX_1

METHOD AND SYSTEM FOR CONTROLLING CALL ANSWER

CROSS-REFERENCE TO RELATED APPLICATIONS

This application claims the benefit of Korean Patent Application No. 10-2014-0158108 filed with the Korean Intellectual Property Office on Nov. 13, 2014, the disclosure of which is incorporated herein by reference.

BACKGROUND

1. Field

The present disclosure relate to a method and a system for controlling answering an incoming call.

2. Description of the Related Art

In general, a mobile communication terminal (hereinafter, a "mobile terminal") refers to a communication device that can be used to perform a communication of voice, video, data, and the like virtually in any place via a wireless communication network.

An example of such a mobile terminal includes a smartphone, which is a highly functional mobile terminal that provides functions of running a program, performing a data communication, connecting to a personal computer (PC), and the like. The smartphone is a hybrid-type wireless communication device having features of a mobile phone and a personal digital assistant (PDA), in which the function of the PDA is incorporated into the mobile phone, in general. The smartphone has come into wide use because it provides PC connection, personal information management, wireless Internet, and the like, as well as voice call.

Recently, with the advance of the mobile terminal, personal information has been leaked and sending of a spam message or a spam call to many and unspecified mobile phone subscribers from an arbitrary spam sender has been abruptly increased by using the leaked personal information.

Korean Patent Application Laid-Open No. 10-2009-0000278 describes a method and an apparatus for controlling incoming call in a mobile communication system.

SUMMARY

A method of controlling answering a call in a system including a service server, a plurality of mobile terminals including a sender terminal and a receiver terminal, and a network configured to allow a communication between the service server and the mobile terminals, according to some embodiments of the present invention, includes displaying, when receiving a call, an incoming call icon and an incoming call screen, which are set in advance at the sender terminal, on the receiver terminal, receiving, upon the incoming call icon being displayed, an input of a predetermined operation on the incoming call screen from a user at the receiver terminal, and permitting answering the call based on the predetermined operation at the receiver terminal.

A system for controlling answering a call, according to some embodiments of the present invention, includes a service server, a plurality of mobile terminals including a sender terminal and a receiver terminal each including a call-answer control apparatus, and a network configured to allow a communication between the service server and the mobile terminals and a communication between a base station and the mobile terminals.

The receiver terminal is configured to display, when receiving a call, an incoming call icon and an incoming call screen, which are set in advance at the sender terminal, and upon receiving an input of a predetermined operation on the incoming call screen from a user, the receiver terminal is configured to permit the call based on the predetermined operation.

The above and other objects, features, advantages and technical and industrial significance of this disclosure will be better understood by reading the following detailed description of exemplary embodiments of the disclosure, when considered in connection with the accompanying drawings.

BRIEF DESCRIPTION OF THE DRAWINGS

FIGS. 6A and 6B are flowchart of a method of permitting a call according to some embodiments of the present invention;

DETAILED DESCRIPTION OF THE PREFERRED EMBODIMENTS

Exemplary embodiments of the present disclosure are described in detail below with reference to the accompanying drawings.

There is a technique developed to inform a user of a mobile terminal, e.g., a smartphone, of contents of a call when there is an incoming call, which is suspected to be a spam call, by filtering calls with a specific phrase to block a spam message or a spam call or by using a database (DB) in which various contents of spam calls are registered.

However, when there is a normal incoming call, which is not a spam call, there is no way to inform the user of contents of a call before answering the call, which are only known to the user after answering the call. To cope with this problem, the other party needs to send a text or a message saying the contents of the call, and this is still cumbersome.

In addition, when there is an incoming call at the owner's absence, anyone other than the owner can operate a call icon on the normal incoming call screen, which may cause leakage of the personal information, leading to an increase of the spam calls.

Therefore, a technique to inform the user of the contents of the call before answering the call in the case of the normal call is advantageous to solve the security problem.

Figure 1:
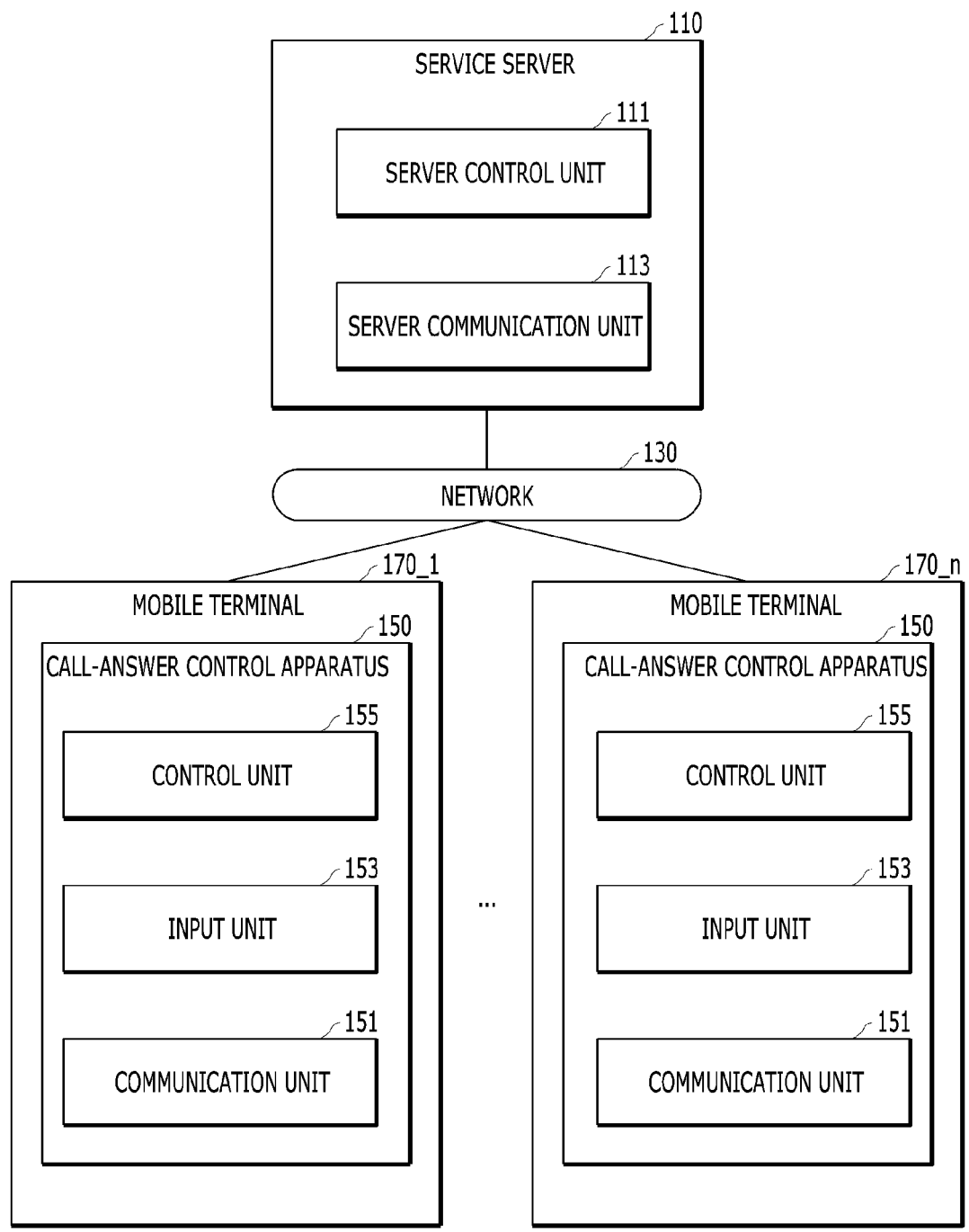
FIG. 1 is a block diagram of a call-answer control system according to some embodiments of the present invention.

FIG. 1 is a block diagram of a call-answer control system according to some embodiments of the present invention.

As shown in FIG. 1, the call-answer control system according to some embodiments includes a service server 110, a network 130, and a plurality of mobile terminals 170_n each including a call-answer control apparatus 150. Hereinafter, these constituent elements are explained in detail with examples of a mobile terminal 170_1 as a sender terminal and a mobile terminal 170_2 as a receiver terminal.

The service server 110 includes a server control unit 111 and a server communication unit 113.

The server control unit 111 controls at least one of an incoming call icon or a background screen (incoming call screen) (hereinafter, collectively referred to as "display information") displayed on a call screen of the mobile terminal 170_2.

When there is change (update) information on the display information during a call between mobile terminals 170_n, the server control unit 111 checks whether or not the display information of the mobile terminal 170_2 is updated reflecting the change information. When the display information is not updated, the server control unit 111 updates the display information of the mobile terminal 170_2 reflecting the change information.

For example, when there is a change information, while an incoming call icon or a background screen including information on a product of "company A" is displayed, to change it to information on a product of "company B", this change information is reflected on the display information of the mobile terminal 170_2.

With the above-mentioned processes, the user can be provided with useful information during a call in real time, and the business owner can maximize the effect of advertisement.

The server communication unit 113 performs a data communication between the service server 110 and the mobile terminals 170_n, which employs WLAN (Wireless LAN) (Wi-Fi), Wibro (Wireless broadband), Wimax (World Interoperability for Microwave Access), HSDPA (High Speed Downlink Packet Access), or the like.

The call-answer control apparatus 150 includes a communication unit 151, an input unit 153, and a control unit 155.

The communication unit 151 includes at least one module that enables a communication between the mobile terminal 170_1, the mobile terminal 170_2, and a mobile terminal base station (not shown) for sending or receiving a call between the mobile terminals 170_n and the network 130 where the mobile terminals 170_n are located. For example, the communication unit 151 includes a mobile communication unit, a short-distance communication unit, and a wireless Internet unit.

The mobile communication unit transmits and receives a wireless signal with respect to at least one of a base station, an external terminal, or a server in a mobile communication network. The wireless signal includes a voice call, a video call, and various types of data according to transmission and reception of a text message or a multimedia message.

The wireless Internet unit refers to a module for a wireless Internet connection, which employs WLAN (Wireless LAN) (Wi-Fi), Wibro (Wireless broadband), Wimax (World Interoperability for Microwave Access), HSDPA (High Speed Downlink Packet Access), or the like.

The short-distance communication unit refers to a module for a short range communication, which employs Bluetooth, RFID (Radio Frequency Identification), IrDA (Infrared Data Association), UWB (Ultra Wideband), Zigbee, or the like.

The input unit 153 receives a signal via the communication unit 151 and transfers the signal to the control unit 155 to allow the control unit 155 to perform a function of controlling a call.

The input unit 153 receives a permitted number of times for which a predetermined operation (e.g., a drag information) is permitted to receive the incoming icon information and text information displayed on the incoming call screen and incoming call.

Figure 2:
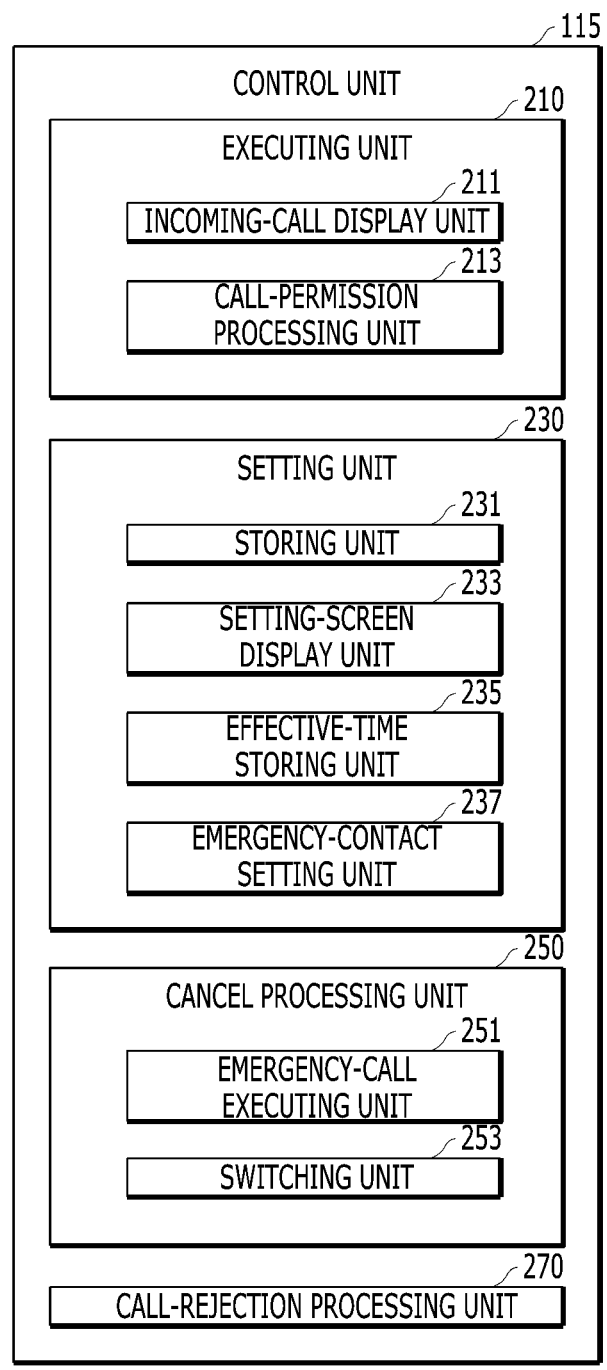
FIG. 2 is a block diagram of a control unit of a call-answer control apparatus according to some embodiments of the present invention.

FIG. 2 is a block diagram of the control unit 155 according to some embodiments of the present invention.

As shown in FIG. 2, the control unit 155 includes an executing unit 210, a setting unit 230, a cancel processing unit 250, and a call-rejection processing unit 270. The control unit 155 can be a processor or a central processing unit (CPU) or a module implemented in the processor or the CPU.

The executing unit 210 includes an incoming-call display unit 211 and a call-permission processing unit 213.

The incoming-call display unit 211 allows the incoming call icon set by a sender at the sender terminal to be displayed on the receiver terminal. At the sender terminal, for example, the user can set the incoming call icon by displaying a plurality of incoming call icons and selecting at least one icon before performing a calling operation. In some embodiments, at the sender terminal, the incoming call icon selected and stored for each user of the mobile terminal in advance, and when a phone number of a mobile terminal to call is inputted, a corresponding incoming call icon is set. In addition, in some embodiments, at the sender terminal, the incoming call icon is set according to a combination of the time at which the calling operation is performed and the mobile terminal to call. Further, in some embodiments, at the sender terminal, the incoming call icon is set corresponding to a location of the sender terminal. When the incoming call icon is set at the sender terminal, the sender terminal sends incoming call icon information for identifying the set incoming call icon to the service server 110, and the input unit 153 receives the incoming call icon information from the service server 110.

Hereinafter, a text icon including a text, an emoticon icon including an emoticon, an image icon including an image, a movie icon including a movie, and a composite icon including at least two of the text, the emoticon, the image, and the movie are described in detail.

The text icon, the emoticon icon, the image icon, the movie icon, and the composite icon are collectively referred to as "designed icon", and the text, the emoticon, the image, and the movie included in the designed icon are collectively referred to as "design information".

In some embodiments, the incoming call icon includes at least one of a basic icon set by a manufacturer of the mobile terminal by default or the designed icon.

In some embodiments, information stored in advance in at least one of a storing unit 231 or the server control unit 111 is used for the designed icon including the design information. In some embodiments, information directly inputted by the user of the mobile terminal 170_1 is used for the designed icon including the design information.

That is, a plurality of pieces of design information is stored in at least one of the storing unit 231 of the setting unit 230 or the service server 110 to be used as appropriate. When one of those pieces of design information is selected at the mobile terminal 170_1 or information for identifying a piece of design information is directly inputted and then sent to the mobile terminal 170_2, the incoming-call display unit 211 displays the incoming call icon including the design information is displayed on the incoming call screen of the mobile terminal 170_2.

Further, when there is a request for updating the display information from the service server 110 during a call, the incoming-call display unit 211 outputs the updated display information on the mobile terminal 170_2 to provide the user useful information in real time. For example, when there is a request for providing information on a product B from the service server 110 while information on a product A is being provided via the incoming call screen and the incoming call icon, the incoming call screen and the incoming call icon are changed to provide the information on the product B.

The call-permission processing unit 213 receives an input of a predetermined operation from the user when there is an incoming call, compares the predetermined operation with an operation for answering the call stored in advance in the storing unit 231 of the setting unit 230 (hereinafter, a "call permission operation"), and determines whether or not to permit answering the call based on a result of the comparison.

When the call permission operation is a drag operation, a direction of the drag operation (hereinafter, a "call permission direction") can be designated, or an area including an end point of the drag operation (hereinafter, a "call permission area") can be designated.

When the direction of the drag operation is designated as the call permission operation, answering the call is permitted when the direction of the input operation on the incoming call screen matches the call permission direction, and otherwise, the input of the drag operation is received again without permitting answering the call.

When the area including the end point of the drag operation is designated as the call permission operation, answering the call is permitted when the end point of the input operation on the incoming call screen falls within the call permission area, and otherwise, the input of the drag operation is received again without permitting answering the call.

In some embodiments, the incoming call icon (security call button) is "an icon according to some embodiments of the present invention" different from a call button and a call-end button typically displayed on a normal incoming call screen. In some embodiments, the incoming call icon is displayed on the normal incoming call screen together with the call button and the cal-end button, and in some embodiments, the incoming call icon is display alone instead of the normal incoming call screen.

In some embodiments, the predetermined operation inputted on the incoming call screen by the user includes at least one of touch, drag, tapping, or flipping with a predetermined pattern starting from the incoming call icon.

In some embodiments, the predetermined pattern includes at least one of time, cycle, direction, speed, or strength of performing the at least one of the touch, the drag, the tapping, or the flipping.

For example, a pattern including time, cycle, speed, or strength of a touch operation, a pattern including time, cycle, direction, speed, or strength of a drag operation, a pattern including cycle, speed, or strength of a tapping operation, a pattern including cycle, speed, or strength of a flipping operation, and any combination thereof can be used as the predetermined pattern.

The setting unit 230 includes a storing unit 231, a setting-screen display unit 233, an effective-time storing unit 235, and an emergency-contact storing unit 237.

The storing unit 231 stores the designed icon, the call permission operation set in advance, and the permitted number of times for which the predetermined operation is permitted.

As described above, the design icon is an icon including the design information indicating contents of the call.

The permitted number is the number of times for which the predetermined operation (e.g., a drag operation) is permitted, and when an operation matching the call permission operation is not inputted exceeding the permitted number of times, the call-rejection processing unit 270 rejects the call.

The setting-screen display unit 233 displays a call-permission-operation setting screen for setting the call permission operation on the mobile terminal 170_2, and the call permission operation inputted by the user on the call-permission-operation setting screen is stored in the storing unit 231. In some embodiments, the call permission operation is either one of the call permission direction and the call permission area.

In some embodiments, a direction guide is further displayed on the call-permission-operation setting screen for setting the call permission direction, and a candidate area is further displayed on the call-permission-operation setting screen for setting the call permission area.

In some embodiments, a common operation content can be set for all the contacts stored in a contact list of the mobile terminal 170_2 as the call permission operation. In some embodiments, different operation content can be set for each individual contact or each individual contact group stored in a contact list of the mobile terminal 170_2 as the call permission operation.

The individual contact means each contact number stored in the contact list, and the individual contact group means a group of contacts grouped by a predetermined category (e.g., family, friend, and the like).

When setting the call permission operation for each individual contact or each individual contact group, the contact or the contact group can be stored together with corresponding information on the call permission operation in the storing unit 231.

The effective-time storing unit 235 sets and stores a time from the touch operation to completion of the input of the effective drag operation (hereinafter, "effective time"). The effective time is an allowed time for receiving the input of the call permission operation, which is determined, for example, to be an elapsed time since the touch operation of the user. In some embodiments, the effective time is determined to be an elapsed time since the incoming call is received.

The emergency-contact storing unit 237 stores emergency contact information that is set to allow any person to answer the call.

The cancel processing unit 250 includes an emergency-call executing unit 251 and a switching unit 253.

The emergency-call executing unit 251 cancels the function of the call-permission processing unit 213 (function of the security call button) or allows the normal incoming call screen without displaying the security call button, when there is a call from the emergency contact stored in the emergency-contact storing unit 237.

When canceling the function of the call-permission processing unit 213, anyone can answer the call with an input of any operation regardless of the position of the touch operation or the position, the direction, or the end point of the drag operation.

A method of answering a call on the normal incoming call screen provided by a manufacturer of the mobile terminal 170_n generally includes dragging of the call icon in a direction set by the manufacture of the mobile terminal, e.g., dragging the call icon toward the call end icon.

Further, depending on a user setting, preset incoming call mode information including the cancel of the function of the call-permission processing unit 213 or the display of the normal incoming call screen and the corresponding emergency contact information can be stored in the emergency-contact storing unit 237.

The switching unit 253 stores a password for switching to a normal call operation set by the user, and when the password is inputted from outside via a remote connection, switches to the normal call mode.

The call-rejection processing unit 270 rejects the call when no operation is inputted for the effective time stored in the effective-time storing unit 223 since the touch operation is performed by the user. In some embodiments, the call-rejection processing unit 270 rejects the call when no operation is inputted for the effective time stored in the effective-time storing unit 223 since the incoming call is received.

Further, in some embodiments, the call-rejection processing unit 270 rejects the call when a drag operation in a predetermined direction (e.g., a lateral (horizontal) direction) is inputted by the user, which is performed to answer a call on the normal incoming call screen. In some embodiments, the call-rejection processing unit 270 rejects the call when a drag operation in a predetermined operation performed in a predetermined area from an edge of the touch screen (e.g., an area within 1 centimeter from the edge) is inputted, which is barely used in a normal operation.

In addition, the call-rejection processing unit 270 rejects the call when an operation that does not match the call permission operation is inputted exceeding the permitted number of times stored in the storing unit 231.

Figure 3:
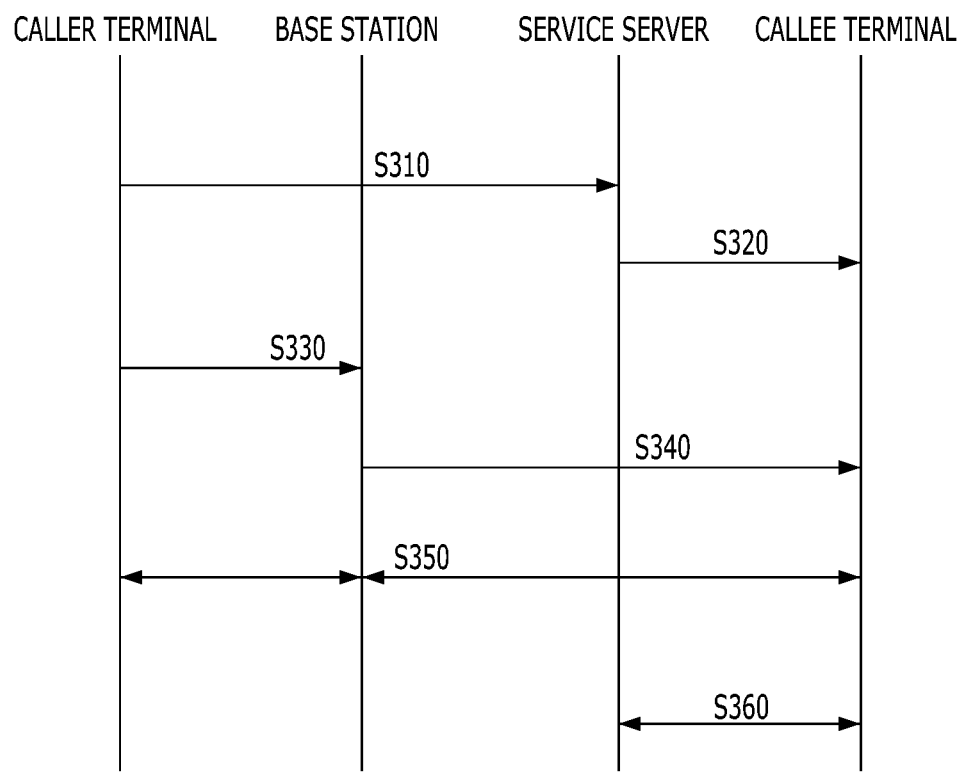
FIG. 3 is a sequence diagram of a method of displaying contents of a call on an incoming call screen according to some embodiments of the present invention.

FIG. 3 is a sequence diagram of a method of displaying contents of a call on the incoming call screen according to some embodiments of the present invention.

As shown in FIG. 3, the input unit 153 receives an input of incoming call icon information selected at the sender terminal (Step S310). The incoming-call display unit 211 transfers the incoming call icon information received at Step S310 to the mobile terminal 170_2 (Step S320). The mobile terminal 170_1 sends a call request signal to the base station (Step S330), and the base station transfers the call request signal to the mobile terminal 170_2 (Step S340). When the call request signal is transferred to the mobile terminal 170_2, the incoming call icon information inputted at Step S310 is displayed on the mobile terminal 170_2 and the user of the mobile terminal 170_2 checks the incoming call icon information displayed on the incoming call screen before answering the call (Step S350). Further, the service server 110 checks whether the display information is updated during the call, when there is change information, checks whether the display information is updated on the mobile terminal 170_2, and when the display information is not updated, updates the display information on the mobile terminal 170_2 (Step S360).

In some embodiments, the incoming call icon information includes sender information, receiver information, and information on a shape of the incoming call icon. The shape of the incoming call icon is either one of a basic type set by the manufacturer of the mobile terminal and a designed icon including the design information indicating the contents of the call. Further, the design information is stored in advance in at least one of the mobile terminal 170_n or the service server 110 to allow the mobile terminal 170_1 to select an icon depending on the situation which the mobile terminal 170_1 faces. Moreover, the design information can be inputted by the user to send information other than the stored design information. The designed icon including the design information selected from the stored pieces of design information or the design information inputted by the user can be displayed on the mobile terminal 170_2.

In some embodiments, a text can be further displayed on the incoming call screen of the mobile terminal 170_2 in addition to the design information. Such a text can be selected from texts stored in advance in at least one of the mobile terminal 170_n of the service server 110 or can be inputted by the user of the mobile terminal 170_1.

Figure 4:
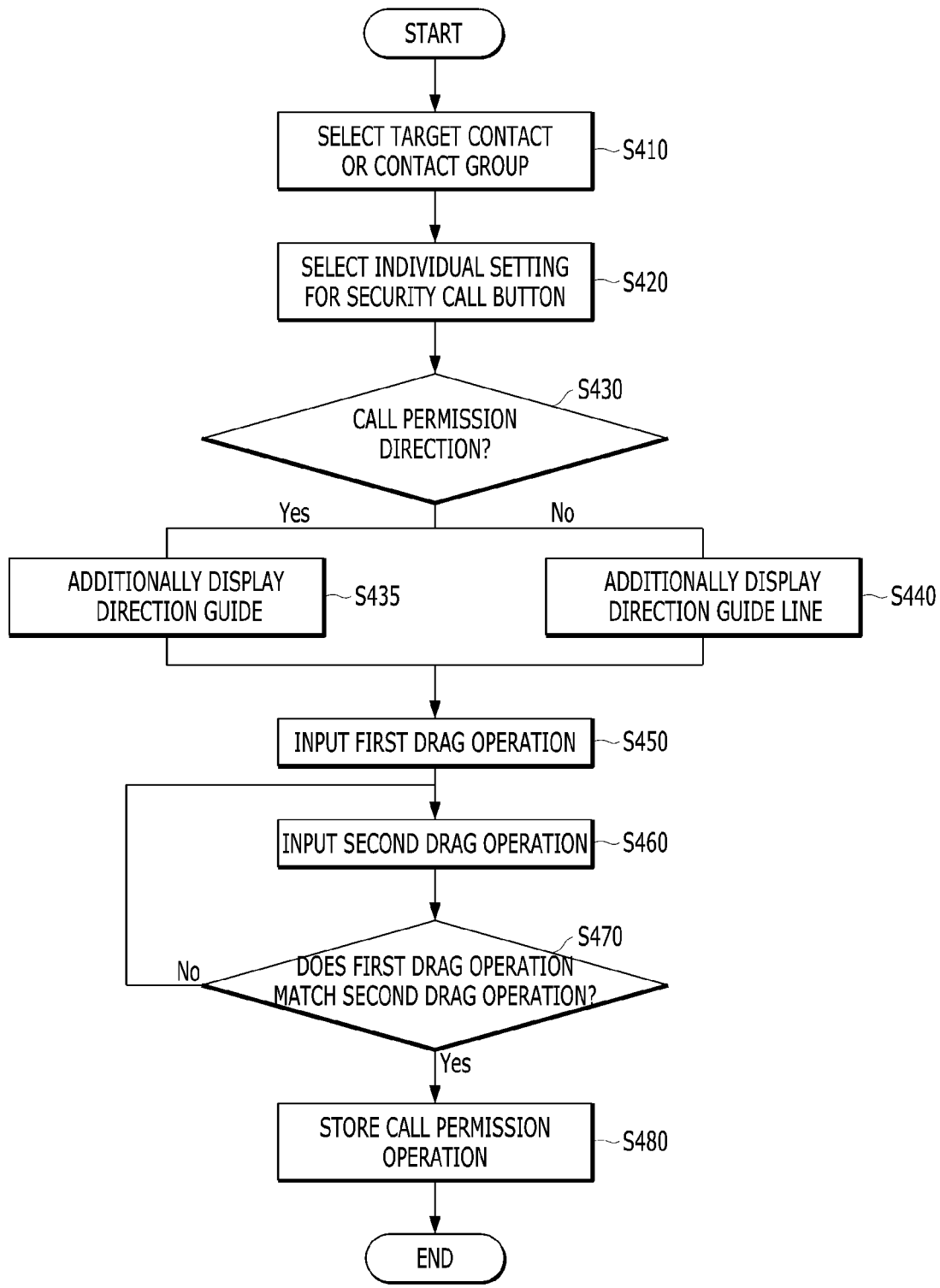
FIG. 4 is a flowchart of a method of setting a call permission operation according to some embodiments of the present invention.

FIG. 4 is a flowchart of a method of setting a call permission operation according to some embodiments of the present invention. In some embodiments, the call permission operation is set at the mobile terminal 170_2.

As shown in FIG. 4, in the method of setting a call permission operation for each contact or contact group, a contact or a contact group for setting the call permission operation is selected (Step S410), and then an individual setting is selected (Step S420). The contact means individual contact number stored in the contact list, and the individual contact group means a group of contacts grouped by a predetermined category. When setting the same call permission operation for all the contacts in the contact list, the above step can be omitted.

It is selected whether to set the call permission direction or the call permission area as the call permission operation (S430), and then the setting-screen display unit 233 displays the call-permission-operation setting screen on a display device of the mobile terminal 170_2. A call icon is displayed on the call-permission-operation setting screen. When the call permission direction is set as the call permission operation, a direction guide is further displayed on the call-permission-operation setting screen (S435), and when the call permission area is set as the call permission operation, a candidate area is further displayed on the call-permission-operation setting screen (S440).

The setting unit 230 receives a predetermined operation from the user, and temporarily stores the received operation in the storing unit 231 (Step S450).

The setting unit 230 can receive a plurality of the same operations in order to verify the received operation, and receives the operation again between Steps S450 and S480 (Step S460). The setting unit 230 compares the operation received at Step S450 with the operation received at Step S460 (Step S470), receives the operation again when the two operations do not match each other, and stores the received operation as the call permission operation in the storing unit 231 when the two operations match each other (Step S480). In some embodiments, the setting unit 230 stores the contact or the contact group designated at Step S410 together with the received operation.

Figure 5:
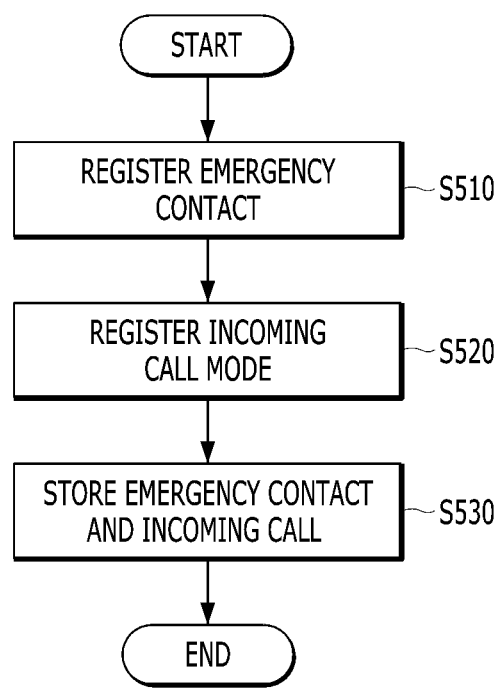
FIG. 5 is a flowchart of a method of setting an emergency contact according to some embodiments of the present invention.

FIG. 5 is a flowchart of a method of setting an emergency contact according to some embodiments of the present invention.

When the owner has lost the mobile terminal such as a smartphone, it may be desired to set a way of canceling the function of the security call button to allow anyone to answer the call.

To this end, as shown in FIG. 5, the user can select an emergency contact from the contact list or input an emergency contact to allow a person around the mobile terminal to receive a call by sending a call to the lost mobile terminal (Step S510). At this time, the user can set one or a plurality of emergency contacts. Thereafter, the user selects an incoming call mode for the call received from the emergency contact (Step S520). The incoming call mode includes a normal call mode and a security-call-button cancel mode. In the normal call mode, the normal incoming call screen is displayed, and the call can be received by dragging the call icon in the lateral direction on the normal incoming call screen. In the security-call-button cancel mode, any touch operation or a drag operation in any direction allows the user or anyone to answer the call. When the emergency contact and the incoming call mode are inputted by the user, the emergency contact and the corresponding incoming call mode are stored in at least one of the emergency-contact storing unit 237 (Step S530).

Figure 6A:
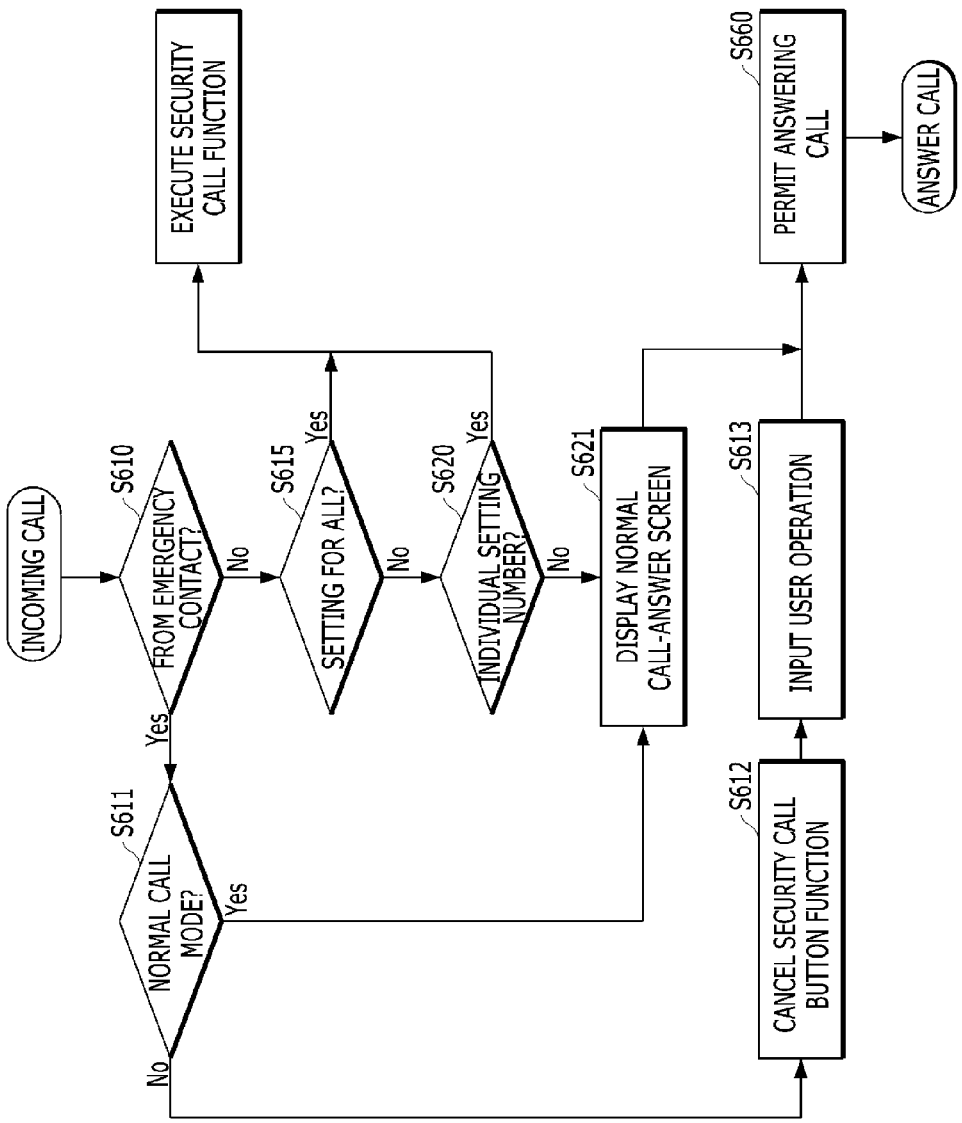

FIGS. 6A and 6B are flowchart of a method of permitting a call according to some embodiments of the present invention.

As shown in FIGS. 6A and 6B, when there is an incoming call, the incoming call number is compared with the emergency contact stored in the emergency-contact storing unit 237 (Step S610). When it is determined that the incoming call number matches the emergency contact, it is determined whether the incoming call mode set in the emergency-call executing unit 251 of the cancel processing unit 250 is the normal call mode or the security-call-button cancel mode (Step S611). When the incoming call mode is the normal call mode, the normal incoming call screen is displayed (S621). When the incoming call mode is the security-call-button cancel mode, the function of the security call button is canceled (Step S612), and when any operation is inputted from the user (Step S613), the call is received regardless of the position of the touch operation or the direction of the drag operation.

When the incoming call number does not match the registered emergency contact, it is determined whether or not the function of the security call button is set for all the contacts at the storing unit 231 of the setting unit 230 (Step S615), and when the function of the security call button is not set for all the contacts, it is determined whether the function of the security call button is set for an individual number (Step S620). When it is determined that the function of the security call button is not set for the individual number, either, the normal incoming call screen is displayed (Step S621), and the user is allowed to answer the call by way of the normal operation on the normal incoming call screen.

When the function of the security call button is set for all the contact stored in the contact list or the phone number of the incoming call is one of the contacts or is the one belongs to a contact group, the call-permission processing unit 213 executes the function of the security call button.

In some embodiments, when the function of the security call button is executed, only the incoming call icon is displayed on the receiver terminal. Thereafter, a predetermined operation is inputted by the user in a state in which only the incoming call icon is displayed (Step S625). For example, when the predetermined operation is a touch operation, the touch operation means a contact on a touch screen of the mobile terminal by using a finger of the user or a stylus pen. It is checked whether the effective time has elapsed after the touch operation is inputted (Step S630), and when no operation is inputted until the effective time elapses since the touch operation is inputted, the call-rejection processing unit 270 rejects the call (Step S631).

For example, when a first drag operation is inputted within the effective time since the touch operation is inputted (Step S635), it is determined whether or not the first drag operation is a drag operation in the lateral direction (Step S640). When the first drag operation is a drag operation in the lateral direction, the call-rejection processing unit 270 rejects the call (Step S631). When the first drag operation is not a drag operation in the lateral direction, the first operation is compared with the call permission operation stored in the storing unit 231 (Step S645), and when the first operation and the call permission operation do not match each other, it is checked whether the number of drag operations has exceeded the permitted number (Step S650). When the number of drag operations has exceeded the permitted number, the call-rejection processing unit 270 rejects the call, and when the number of drag operations is within the permitted number, the user is requested to input the touch operation from scratch. When the input drag operation and the call permission operation match each other, the user is allowed to answer the call (Step S650).

Figure 7A:
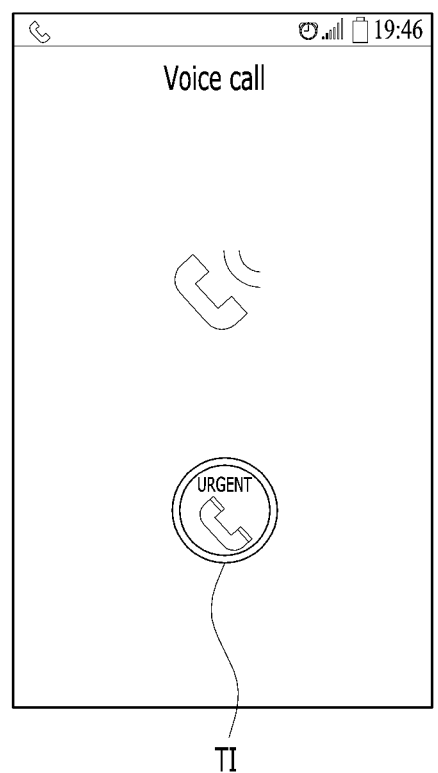
FIGS. 7A to 7G are schematic diagrams for illustrating an application example of an incoming call icon including at least one of text, emoticon, image, or movie according to some embodiments of the present invention.
Figure 7B:
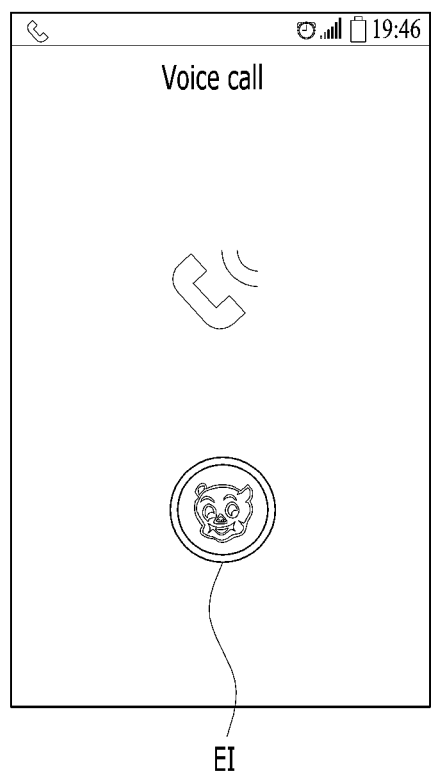
Figure 7C:
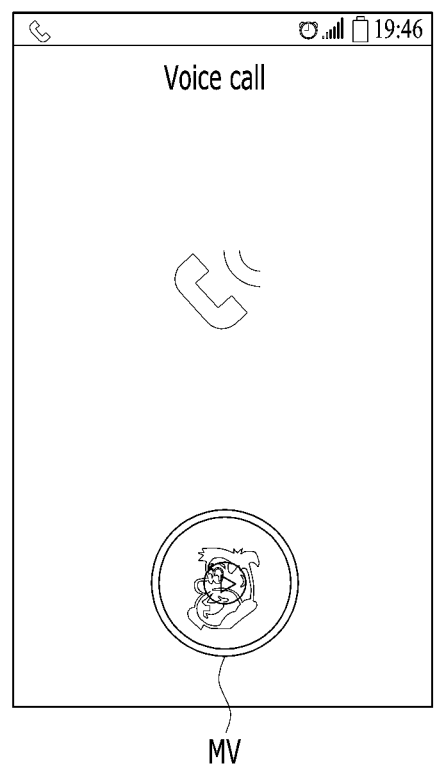
Figure 7D:
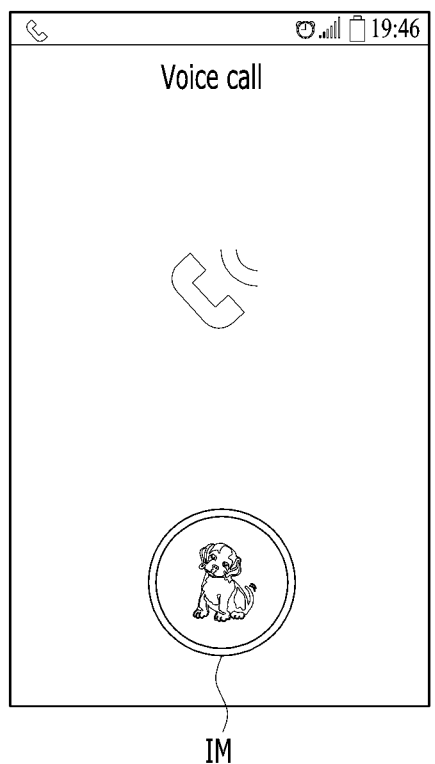
Figure 7E:
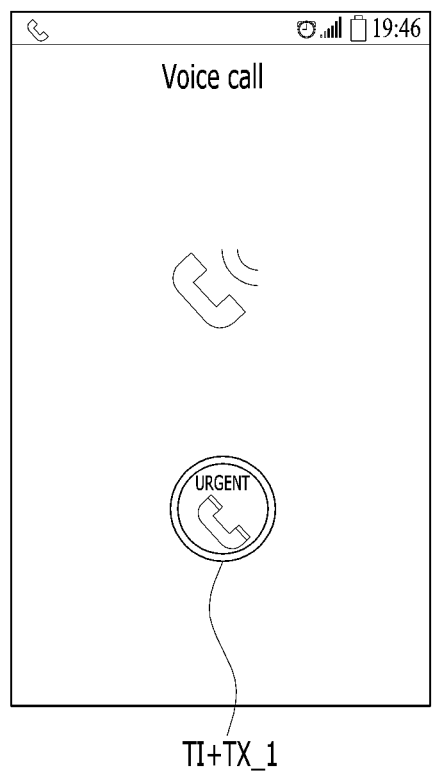
Figure 7F:
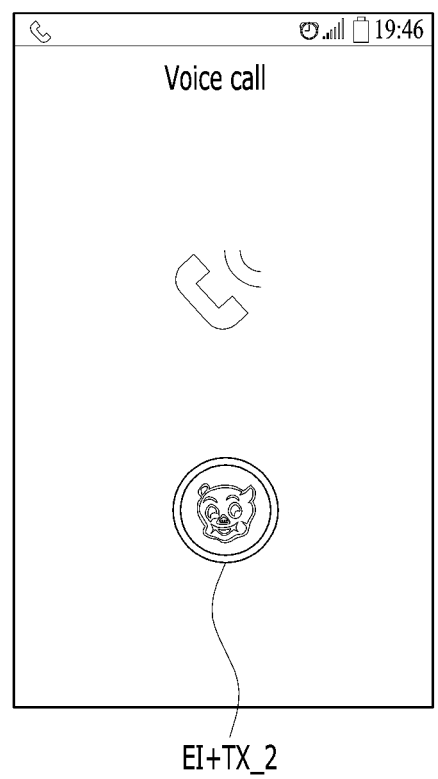
Figure 7G:
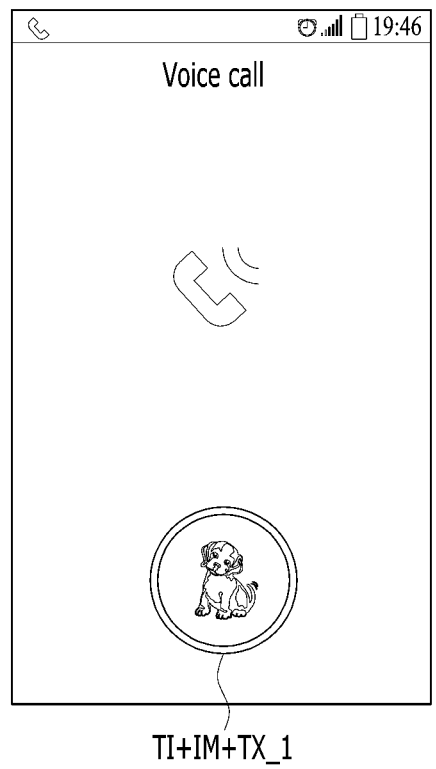

FIGS. 7A to 7G are schematic diagrams for illustrating an application example of an incoming call icon including at least one of text, emoticon, image, or movie according to some embodiments of the present invention. FIG. 7A shows a text icon, FIG. 7B shows an emoticon icon, FIG. 7C shows a movie icon, FIG. 7D shows an image icon, and FIGS. 7E to 7G show composite icons including a text, an emoticon, and an image.

As shown in FIGS. 7A to 7G, the text icon includes an icon TI including a text such as URGENT, Normal, SOS, HELP, Regards, or the like, the emoticon icon includes an icon EI including an emoticon indicating the contents of the call, the movie icon includes an icon MV including a movie, and the image icon includes an icon IM including an image. Further, as shown in FIGS. 7E to 7G, a text TX_1 selected at the sender terminal or a text TX_2 inputted by the user at the sender terminal can be displayed together with the icon including the text, the emoticon, the image, or the movie. Moreover, the text TX_1 and the text TX_2 can be displayed in different colors from each other to help the user of the receiver terminal to easily understand the texts.

Figure 8A:
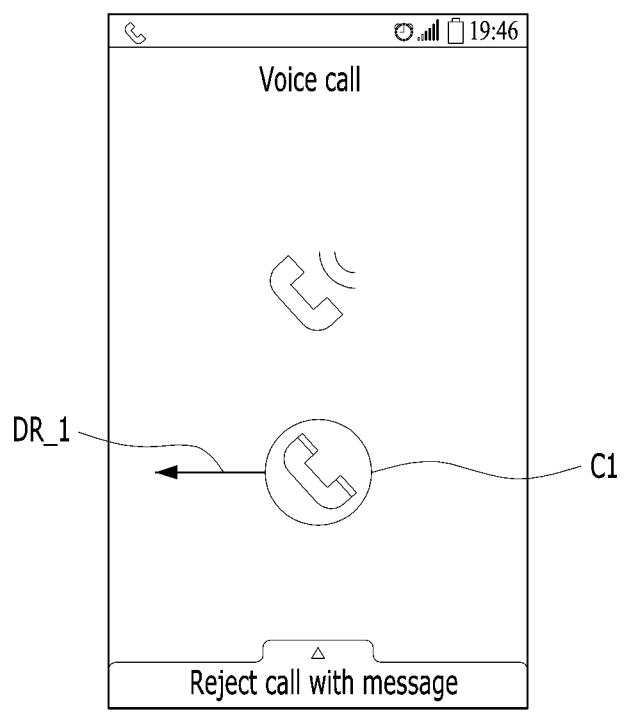
FIGS. 8A to 8C are schematic diagrams for illustrating an application example of a method of rejecting a call according to some embodiments of the present invention.
Figure 8B:
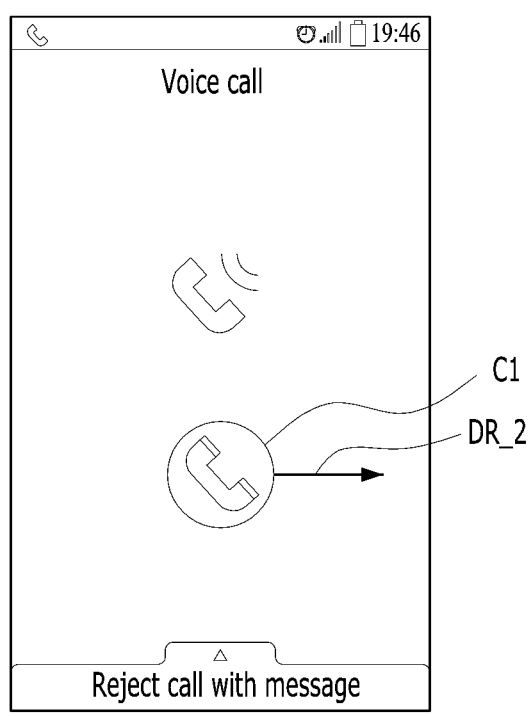
Figure 8C:
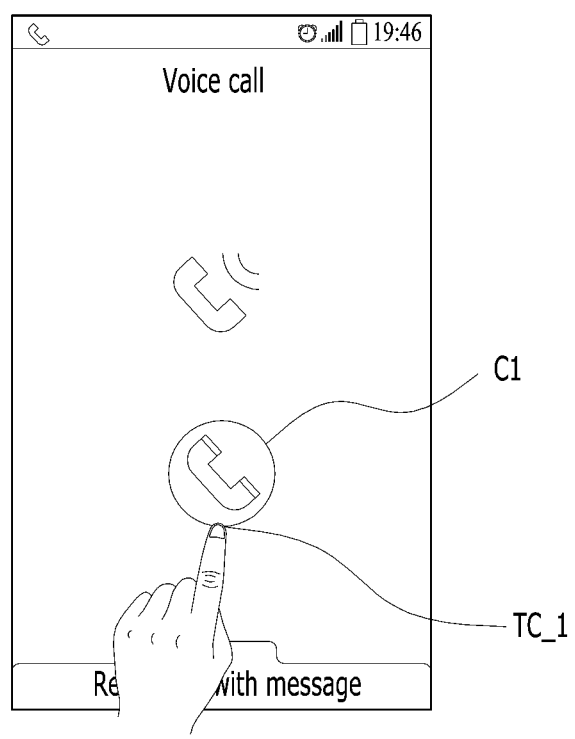

FIGS. 8A to 8C are schematic diagrams for illustrating an application example of a method of rejecting a call according to some embodiments of the present invention.

As shown in FIGS. 8A to 8C, when there is an incoming call, if a drag operation (DR_1, DR_2) in the lateral direction or only a touch operation (TC_1) is inputted in a state in which an incoming call icon (CI) is displayed, the call-rejection processing unit 270 rejects the call.

Although it is not shown in the drawings, the call-rejection processing unit 270 also rejects the call when an operation that does not match the call permission operation is tried exceeding the permitted number of times.

Figure 9A:
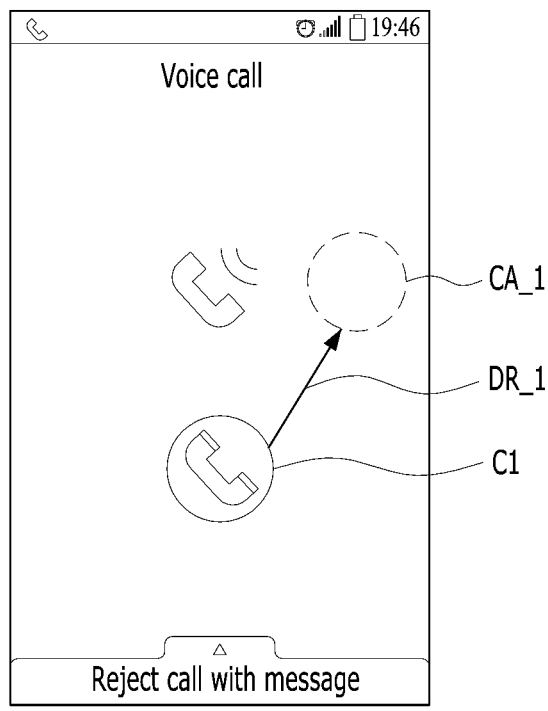
FIGS. 9A and 9B are schematic diagrams for illustrating an application example of a method of permitting a call according to some embodiments of the present invention.
Figure 9B:
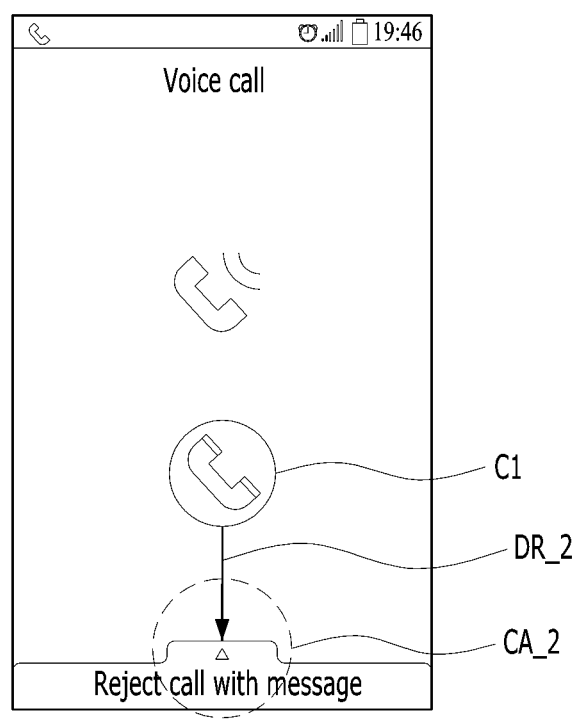

FIGS. 9A and 9B are schematic diagrams for illustrating an application example of a method of permitting a call according to some embodiments of the present invention.

As shown in FIGS. 9A and 9B, when there is an incoming call and the incoming call icon (CI) is displayed, the user is allowed to answer the call by way of the drag operation (DR_1, DR_2) to a direction matching the call permission operation corresponding to the incoming call number (when the call permission direction is set) or to an area matching the call permission operation corresponding to the incoming call number (when the call permission area is set).

As described above, the apparatus for controlling answering a call, according to some embodiments of the present invention, includes a display unit configured to display an incoming call icon when receiving a call, the incoming call icon differing from a call answer icon and a call end icon of a normal incoming call screen, a touch screen configured, upon the display unit displaying the incoming call icon, to receive an input of a predetermined operation with respect to the incoming call icon from a user, and a control unit including a call-permission processing unit configured to compare the predetermined operation with a preset call permission operation set in advance with respect to the incoming call icon and to permit answering the call when the predetermined operation matches the preset call permission operation.

Further, the method of controlling answering a call, according to some embodiments of the present invention, includes displaying an incoming call icon when receiving a call, the incoming call icon differing from a call answer icon and a call end icon of a normal incoming call screen, receiving, upon the display unit displaying the incoming call icon, an input of a predetermined operation with respect to the incoming call icon from a user, comparing the predetermined operation with a preset call permission operation set in advance with respect to the incoming call icon, and permitting answering the call when the predetermined operation matches the preset call permission operation.

Moreover, the mobile terminal, according to some embodiments of the present invention, includes the above mentioned apparatus and method.

In some embodiments, the predetermined operation inputted on the incoming call screen by the user includes at least one of touch, drag, tapping, or flipping with a predetermined pattern starting from the incoming call icon.

In some embodiments, the predetermined pattern includes at least one of time, cycle, direction, speed, or strength of performing the at least one of the touch, the drag, the tapping, or the flipping.

For example, a pattern including time, cycle, speed, or strength of a touch operation, a pattern including time, cycle, direction, speed, or strength of a drag operation, a pattern including cycle, speed, or strength of a tapping operation, a pattern including cycle, speed, or strength of a flipping operation, and any combination thereof can be used as the predetermined pattern.

It is an object of the present invention to provide a method and a system for controlling answering a call, which enable a user of a mobile terminal to know contents of a call before answering the call to selectively answer the call, disable anyone other than the owner of the mobile terminal to answer the call to protect the personal information, and provide useful information to the user on the incoming call screen during the call in real time.

The method and the system for controlling answering a call according to some embodiments of the present invention has following effects.

Firstly, the user of a receiver terminal can figure out contents of a call without a separate notification from a sender terminal, by displaying the contents of the call on the incoming call screen.

Secondly, the personal information can be prevented from being leaked by disabling anyone other than the owner of the mobile terminal to answer the call by way of an operation set in advance for the incoming call icon (security call button) on the incoming call screen.

Thirdly, the user can be provided with useful information on during a call in real time, enhancing the user satisfaction.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling answering a call in a system including a service server, a plurality of mobile terminals including a sender terminal and a receiver terminal, and a network configured to allow a communication between the service server and the mobile terminals, the method comprising:
displaying, when receiving a call, an incoming call icon and an incoming call screen, which are set in advance at the sender terminal, on the receiver terminal, the incoming call icon differing from a call answer icon and a call end icon of a normal incoming call screen;
receiving, upon the incoming call icon being displayed, an input of a predetermined operation on the incoming call screen starting from the incoming call icon from a user at the receiver terminal; and
permitting answering the call based on the predetermined operation at the receiver terminal, wherein
the permitting includes
comparing the predetermined operation with a call permission operation set in advance at the receiver terminal, and
permitting the call, when it is determined that the predetermined operation matches the call permission operation at the comparing,
the method further comprises setting the call permission operation at the receiver terminal, and
the setting the call permission operation includes
displaying a call-permission-operation setting screen including a call icon corresponding to the incoming call icon,
receiving a first operation starting from the call icon on the call-permission-operation setting screen, and
storing the first operation as the call permission operation.

2. The method according to claim 1, further comprising:
checking whether or not there is change information for the incoming call icon or the incoming call screen at the service server; and
modifying, when there is the change information, the incoming call icon or the incoming call screen at the service server.

3. The method according to claim 1, further comprising setting the incoming call icon and the incoming call screen at the sender terminal.

4. The method according to claim 1, wherein the incoming call icon includes
a basic icon stored in each of the mobile terminals by default, and
a plurality of designed icons for representing contents of the call.

5. The method according to claim 4, wherein
each of the designed icons includes design information including any one selected from the group consisting of character, emoticon, movie, image, and any combination thereof, and
the design information is any one selected from the group consisting of information stored in advance in the sender terminal, information inputted by the user of the sender terminal, and a combination thereof.

6. The method according to claim 3, wherein
the setting includes setting a text at the sender terminal,
the text is any one selected from the group consisting of a text stored in advance in the sender terminal, a text inputted by the user of the sender terminal, and a combination thereof, and
the displaying includes further displaying the text on the incoming call screen.

7. The method according to claim 1, wherein the predetermined operation includes at least one of touch, drag, tapping, or flipping with a predetermined pattern starting from the incoming call icon.

8. The method according to claim 7, wherein the predetermined pattern includes at least one of time, cycle, direction, speed, or strength of performing the at least one of the touch, the drag, the tapping, or the flipping.

9. The method according to claim 1, wherein
the call permission operation includes a direction of the first operation starting from the call icon, and
the displaying the call-permission-operation setting screen includes displaying a direction guide on the call-permission-operation setting screen.

10. The method according to claim 1, wherein
the call permission operation includes an area to which an end point of the first operation starting from the call icon belongs, and
the displaying the call-permission-operation setting screen includes displaying a candidate area for the area to which the end point belongs on the call-permission-operation setting screen.

11. The method according to claim 1, further comprising setting an emergency contact at the receiver terminal, wherein
when the call is from the emergency contact, the permitting includes permitting the call upon receiving an arbitrary operation from the user without performing the comparing.

12. The method according to claim 11, wherein the setting the emergency contact includes setting an incoming call mode including a normal call mode and a security-call-button cancel mode.

13. The method according to claim 12, wherein
in the security-call-button cancel mode, the permitting includes permitting the call upon receiving an arbitrary operation from the user regardless of position or direction of the predetermined operation, and
in the normal call mode, the permitting includes permitting the call by way of a call receiving operation set in each of the mobile terminal by default.

14. The method according to claim 12, further comprising:
setting a password for switching the incoming call mode; and
switching, upon receiving the password from outside via a remote connection, the incoming call mode to the normal call mode at the receiver terminal.

15. The method according to claim 1, further comprising:
setting a permitted number of times for which the predetermined operation is permitted at the receiver terminal; and
rejecting the call, when a drag operation in a lateral operation, a touch operation in the lateral direction, or an operation different from the call permission operation is inputted exceeding the permitted number of times.

16. A system for controlling answering a call, the system comprising:
a service server;
a plurality of mobile terminals including a sender terminal and a receiver terminal each including a processor; and
a mobile communication network configured to allow a mobile communication between the service server and the mobile terminals and a mobile communication between a base station and the mobile terminals, wherein
the processor of the receiver terminal is configured to display, when receiving a call, an incoming call icon and an incoming call screen, which are set in advance at the sender terminal, the incoming call icon differing from a call answer icon and a call end icon of a normal incoming call screen, and
upon receiving an input of a predetermined operation on the incoming call screen starting from the incoming call icon from a user, the processor of the receiver terminal is configured to permit the call based on the predetermined operation,
the processor of the sender terminal includes
a setting unit including a first memory configured to store a plurality of designed icons each including design information for representing contents of the call and an emergency-contact setting unit configured to receive emergency contact from the user and including a second memory configured to store the emergency contact, and
a cancel processing unit including an emergency-call executing unit configured, when the call is from the emergency contact, to allow the call to be answered upon receiving an arbitrary operation from the user or to display the normal incoming call screen, regardless of position of the predetermined operation, direction of the predetermined operation, or position of an end point of the predetermined operation and a switching unit configured to allow the normal incoming call screen to be displayed, when a preset password is inputted from outside via a remote connection,
the design information includes any one selected from the group consisting of character, emoticon, movie, image, and any combination thereof, wherein
the incoming call icon includes at least one of the design icons; the processor of the receive terminal includes: a setting unit including a setting-screen display unit and a storing unit; the setting-screen display unit configured to display a call-permission-operation setting screen including a call icon corresponding to the incoming call icon and to receive a first operation starting from the call icon on the call-permission-operation setting screen; and the storing unit configured to store the first operation as the call permission operation.

17. The system according to claim 16, wherein
the service server includes
a server control unit, and
a server communication unit, and
the server control unit is configured
to check whether or not there is change information for the incoming call icon or the incoming call screen, and
to modify, when there is the change information, the incoming call icon or the incoming call screen displayed on the receiver terminal.

18. The system according to claim 16, wherein the processor of the receiver terminal includes an input unit configured to receive the design information from the sender terminal.

19. The system according to claim 18, wherein the input unit is configured to receive an input of a text from the sender terminal, and the processor of the receiver terminal further includes an incoming-call display unit configured to display the incoming call icon and the text.

20. The system according to claim 16, wherein the processor of the receiver terminal includes an executing unit, and the executing unit includes a call-permission processing unit configured to compare the predetermined operation with a call permission operation set in advance, and to permit the call, when it is determined that the predetermined operation matches the call permission operation from a result of comparison.

21. The system according to claim 20, wherein the setting unit further includes a setting-screen display unit configured to display a call-permission-operation setting screen, and the first memory is configured to receive the call permission operation via the call-permission-operation setting screen from the user, and to store the call permission operation.

22. The system according to claim 20, wherein the processor of the receiver terminal further includes a call-rejection processing unit configured to reject the call, the setting unit further includes an effective-time setting unit configured to set an effective time from a touch on the touch screen until the input of the predetermined operation is completed, the first memory is configured to store a permitted number of times for which the predetermined operation is permitted, and when a drag operation in a lateral operation, a touch operation in the lateral direction, or an operation different from the call permission operation is inputted exceeding the permitted number of times, the call-rejection processing unit is configured to reject the call.

23. The system according to claim 16, wherein the predetermined operation includes at least one of touch, drag, tapping, or flipping with a predetermined pattern starting from the incoming call icon.

24. The system according to claim 23, wherein the predetermined pattern includes at least one of time, cycle, direction, speed, or strength of performing the at least one of the touch, the drag, the tapping, or the flipping.

* * * * *